US006568349B1

(12) United States Patent
Hughes et al.

(10) Patent No.: US 6,568,349 B1
(45) Date of Patent: May 27, 2003

(54) GROUND GRAIN ANIMAL LITTER

(75) Inventors: Mike Hughes, Detroit Lakes, MN (US); Alan Doeringg, Good Thunder, MN (US); Jack Johnson, Waseca, MN (US)

(73) Assignee: Pet Care Systems, Inc., DetroitLakes, MN (US)

( * ) Notice: Subject to any disclaimer, the term of this patent is extended or adjusted under 35 U.S.C. 154(b) by 0 days.

(21) Appl. No.: 09/721,272

(22) Filed: Nov. 22, 2000

(51) Int. Cl.$^7$ ................................................. A01K 29/00
(52) U.S. Cl. ....................................................... 119/171
(58) Field of Search ................................. 119/171, 172, 119/173

(56) References Cited

U.S. PATENT DOCUMENTS

| | | | |
|---|---|---|---|
| 327,250 A | 9/1885 | Foulds | |
| 3,059,615 A | 10/1962 | Kuceski et al. | |
| 3,921,581 A | 11/1975 | Brewer | |
| 3,983,842 A | 10/1976 | Marion et al. | |
| 4,159,008 A | * 6/1979 | Bavaveas | 119/171 |
| 4,206,718 A | 6/1980 | Brewer | |
| 4,217,858 A | 8/1980 | Dantoni | |
| 4,258,660 A | 3/1981 | Pris et al. | |
| 4,341,180 A | 7/1982 | Cortigene et al. | |
| 4,405,354 A | * 9/1983 | Thomas, II et al. | 71/21 |
| 4,519,340 A | 5/1985 | Dickey | |
| 4,571,389 A | 2/1986 | Goodwin et al. | |
| 4,685,420 A | 8/1987 | Stuart | |
| 4,727,824 A | 3/1988 | Ducharme et al. | |
| 4,883,021 A | 11/1989 | Ducharme et al. | |
| 4,924,808 A | 5/1990 | Pirotte | |
| 4,963,366 A | 10/1990 | Thomas | |
| 5,014,650 A | 5/1991 | Sowle et al. | |
| 5,109,804 A | 5/1992 | Chikazawa | |
| 5,152,250 A | 10/1992 | Loeb | |
| 5,176,107 A | 1/1993 | Buschur | |
| 5,209,185 A | 5/1993 | Chikazawa | |
| 5,216,980 A | 6/1993 | Kiebke | |
| 5,230,305 A | 7/1993 | House | |
| 5,271,355 A | * 12/1993 | Bilings | 119/171 |
| 5,347,950 A | 9/1994 | Kasbo et al. | |
| 5,361,719 A | 11/1994 | Kiebke | |
| 5,448,967 A | 9/1995 | Ryan | |
| 5,526,770 A | 6/1996 | Kiebke | |
| 5,609,123 A | * 3/1997 | Luke et al. | 119/173 |
| 5,690,052 A | 11/1997 | Sladek | |
| 5,884,584 A | * 3/1999 | Feldman | 119/171 |
| 6,014,947 A | 1/2000 | Sladek et al. | |
| 6,098,569 A | * 8/2000 | Kent et al. | 119/171 |

FOREIGN PATENT DOCUMENTS

| | | |
|---|---|---|
| EP | 0 076 122 B1 | 12/1985 |
| FR | 2 451 159 A | 11/1980 |
| JP | 3 021 251 A | 1/1991 |
| JP | 5 049 360 A | 3/1993 |
| NL | 9 100 418 A | 10/1992 |

* cited by examiner

Primary Examiner—Charles T. Jordan
Assistant Examiner—Tara M Golba
(74) Attorney, Agent, or Firm—Welsh & Katz, Ltd.

(57) ABSTRACT

The present invention pertains to a natural product litter composition as well as methods of preparing and using a natural product litter as a sorbent for liquids. The sorbent contains 1% to 50% by weight wood particles and 50% to 99% by weight ground grain. The sorbency of a ground grain litter can be improved by pelletization and crumbling. Addition of up to 50% of wood particles to a ground grain litter further enhances the sorbency while maintaining suitable swelling and clumping characteristics.

35 Claims, No Drawings

GROUND GRAIN ANIMAL LITTER

FIELD OF THE INVENTION

The present invention pertains to a natural product litter composition and methods for use as a sorbent for liquids.

BACKGROUND

The use of litter as a sorbent for pet animal urine and other waste liquids has been known for years. Typically, the litter is placed into a container or in an area in which the pet has been trained to use for urinating and defecating. Many prior art litters have been derived from sand, clay, and other minimally sorbent materials. More recently the useful life and sorbency of these litters has been increased by addition of binders and other additives which cause a clump to form from litter soiled by urine and fecal liquids. See e.g., U.S. Pat. Nos. 5,216,980 and 5,176,107. Formation of soiled litter into a clump, in part, minimizes the spread of urine or fecal liquids thus minimizing contamination of the unsoiled litter surrounding the excreted waste liquids. Additionally, clumping reduces the tracking of the soiled litter out of the litter container.

More recently, natural products such as grains, cellulosic products such as sawdust, woodchips or plant hulls have been used as a litter. See eg, U.S. Pat. Nos. 4,206,718; 4,727,824; 4,883,021; 5,109,804; 5,152,250; 5,690,052; 6,014,947. These products were developed in an effort to enhance the sorbency of the litter as well as provide a biodegradable litter. Litters with higher sorbency can minimize odors, reduce the amount of litter required and minimize disposal problems of the wetted litter. Although highly sorbent litters have been prepared, many of them tend to swell excessively when contacted with liquids causing problems such as blockage of sewer or septic lines when flushed down a commode.

The present invention is directed to providing a highly sorbent natural product litter with low swelling and suitable clumping characteristics. The invention also provides methods for preparing and using natural product litters with high sorbency, low swelling and suitable clumping characteristics.

SUMMARY OF THE INVENTION

The present invention provides an improved natural product sorbent composition. The sorbent can be a mixture of 50% to 99% by weight ground grain and 1 to 50% by weight wood particles. The sorbent is biodegradable, scoopable and flushable. The ground grain is typically prepared from cereal grains. In one preferred embodiment, the cereal grains are wheat varieties including white wheat, spring wheat, winter wheat, durum, and combinations thereof. The wood particles are typically derived from trees with wood having good sorbency characteristics such as, for example, aspen, poplar, pine, birch, cedar, and combinations thereof. The wood particles typically sorb an amount of liquid based on weight equal to at least about 1.0 times and preferably at least about 2.0 times and more preferably at least about 3.0 times the weight of the sorbent. Preferably, the wood particles are sawdust or wood chips that are smaller than about 4 mm. A preferred composition is one in which the ground grain is hard red spring wheat and the wood particles are aspen. Upon contact with a liquid, the sorbent can sorb an amount of liquid based on weight equal to at least about 1.0 times and preferably at least about 1.5 times and more preferably at least about 2.0 times the weight of the sorbent.

The invention also provides a method for preparing a sorbent containing 1 to 50% by weight wood particles and 50% to 99% by weight ground grain. After selection of wood particles and ground grain, a litter mixture is prepared. In one embodiment, the litter mixture is pelletized. In another embodiment, the pellets are crumbled.

In another embodiment, the invention provides a method for producing a pelletized sorbent from ground grain. The ground grain pellet may contain additives including, for example, wood particles to improve sorbency, deodorants, agents to inhibit microbial growth, anti-dusting agents and animal attractants. In one embodiment, the pellets are crumbled.

The invention also provides a method for sorbing liquid using a sorbent containing ground grain and wood particles. Ground grain and wood particles are selected and mixed to produce a litter mixture. The mixture contains 50% to 99% by weight of a ground grain and 1 to 50% by weight of wood particles. The litter is situated such that a liquid to be sorbed can contact it. Upon contact with the liquid, the litter mixture preferably forms a clump and sorbs an amount of liquid based on weight equal to at least about 1.0 times and preferably at least about 1.5 times and more preferably at least about 2.0 times the weight of the litter mixture.

DETAILED DESCRIPTION

The present invention provides an improved natural product sorbent composition and methods for sorbing liquids. The sorbent composition can be a litter mixture of ground grain and wood particles. Preferably, the sorbent has low odor and is biodegradable. Upon contact with a liquid, the sorbent can form a low attrition clump that is easily separated from the surrounding unwetted sorbent. When the sorbent is disposed of down a commode, the clumps can break down. The sorbent typically has a low tendency to swell, thus reducing the likelihood of plugging a sewer or septic system upon disposal.

A ground grain of the invention can be prepared from, for example, cereal grains such as wheat, sorghum, barley, rice, oats, rye, triticale, millet, corn and other grains for which "cereal grain" is a generic term. The ground grain may be prepared from a single grain or combination of grains. The grains may be combined before or after the grinding process. Preferred cereal grains of the invention may be selected from the group of wheat varieties including white wheat, spring wheat, winter wheat, durum and the like. In one preferred embodiment, the ground grain is hard red spring wheat.

The ground grain is prepared by grinding whole raw grain. Prior to grinding, the whole raw grain can be put through a cleaning device to remove foreign materials including stones, rocks, metal, dirt, dust, weed seed and other nongrain material. Such cleaning devices are known in the art and include, for example, magnets, disk cleaning mills, sieve cleaning mills and similar devices. The grain may then optimally be subjected to disinfestation using an infestation destroyer. The order in which the grain is cleaned and disinfested is not important. Infestation destroyers are known in the art.

After the grain is cleaned and disinfested, it is subjected to a roller or a hammer mill to crush the whole grain into smaller particles. After the grain is crushed (ground) it moves into a sifter where large particles are separated by passing through a mesh sieve and returned to the roller or hammer mill until the proper particle size is achieved. Typically, the particle size is reduced such that at least 95% of the particles are less than 4 mm (pass through a 5 mesh screen). Preferably, at least 95% of the particles are between 4 mm and 125 µm (pass through a 5 mesh screen but not a 120 mesh screen).

Wood particles of the invention can be produced, for example, by grinding, milling, or cutting. The source of wood can be, for example, trees, timber, cellulose fibers, or wood by-products such as bark and wood shavings. A single type of wood or combination of wood types can be used.

Typically, the wood particles are sorbent materials that can sorb an amount of liquid in weight between about 0.5 times to about 5.0 times the weight of the wood particles. The wood particles typically can sorb an amount of liquid equal to at least 1 times and preferably 2 times and more preferably at least 3 times the weight of the wood particles. Sorption includes both adsorption and absorption of the liquid into or onto the wood particles. Suitable sorbent wood materials include, for example aspen, poplar, birch, pine, cedar, and the like.

The wood particles typically are obtained by grinding or milling. The wood particles may be derived from a pelletized or ground wood product. Sources of ground and pelletized aspen products include Green Pet Products, Conrad, IA and Lone Tree By-Products, Bagley, Minn. The particle size of the wood is typically reduced such that at least 95% of the particles are less than about 4 mm (pass through a 5 mesh screen). Preferably, at least 95% of the particles are between about 4 mm and about 125 µm (pass through a 5 mesh screen but not a 120 mesh screen).

One aspect of the invention provides a sorbent composition comprising 50% to 99% by weight of a ground grain and 1% to 50% by weight of wood particles. The composition preferably comprises about 5% to about 35% wood particles and more preferably comprises about 10% to about 30% wood particles. Other additives may be present including, for example, compounds that function as deodorants, agents to inhibit microbial growth, anti-dusting agents and animal attractants. Additives to mask or neutralize odors, for example, can be baking soda or natural products oils such as Nilecho (a natural product oil product containing 50 natural oils sold by Nilodor, Inc., Bolivar, Ohio). Animal attractants, for example, can be natural proteins such as wheat. Anti-dusting agents, for example, can be a vegetable oil such as soybean oil.

In one embodiment, the sorbent can sorb an amount of liquid based on weight between about 0.5 times and about 5.0 times the weight of the sorbent. Typically, the sorbent can sorb an amount of liquid based on weight equal to at least 1.0 times and preferably at least 1.5 times and more preferably at least 2.0 times the weight of the litter mixture. As used herein, "sorption" includes both adsorption and absorption of the liquid into or onto the sorbent. Sorbency can be measured using ASTM Standard F 726–99 (published in 1999) for a Type II sorbent. Water is placed in the test cell, a glass crystallizing dish. A sample of the sorbent is weighed, placed in a wire mesh basket (27 mesh size −0.063" −0.16 cm) and lowered into the test cell. Some of the sorbent will float within the test cell. After 15 minutes, the sorbent is removed from the water using the mesh basket. The basket is allowed to drain for 30 minutes. The sorbent is weighed again to calculate the amount of liquid sorbed.

The sorbent of the invention tends to form a low attrition clump upon contact with liquids. If the wood particle content gets too high, the litter does not clump upon exposure to liquid waste. The phrase "low attrition clump" means a clump that, after drying, loses less than about 15% of its weight and preferably less than about 10% of its weight when subjected to attrition testing. Attrition testing involves wetting the litter mixture with 6 grams of water and allowing the sorbed water to set for 10 to 15 minutes. The clumps that form are carefully removed from the nonwetted litter and dried. The dried clumps are weighed. Then the bonded but poorly adhered litter on the surface of the clumps is removed by gently rubbing a finger across the surface. The removed litter is weighed to calculate the % weight loss. The % weight loss is the % attrition.

Low attrition clumps are advantageous because they are less likely to lose particles of soiled litter when the clump is removed from the surrounding unsoiled litter in a litter container. A low attrition clump can provide a significant advantage by increasing the useful life of the litter through decreased contamination of the unsoiled litter by soiled litter falling away from the clump. Additionally, clumping prevents particles from breaking off of a soiled clump if subjected to compression by an animal stepping on the clumps while moving around in the litter. The tracking of the litter outside the litter container can be minimized.

The sorbent composition tends to swell less than some other natural product litters. As used herein, "swell" means the tendency of the litter to increase in volume when contacted with a liquid. This attribute is particularly beneficial if the soiled litter is flushed down a commode attached to a sewer or septic system. By using a litter that swells less upon contact with liquids, sewer or septic systems have fewer tendencies to become blocked or plugged when the litter is flushed down a commode. Compositions with greater than about 50% wood particles based on the weight of the litter tend to swell more than preferred. A litter that swells 100% means that the sorbent doubles in volume upon contact with the water. Compositions of this invention typically swell less than about 10% based on the volume of the sorbent. The sorbent preferably has no volume change on exposure to a liquid and most preferably shrinks upon contact with liquid.

Another aspect of the invention provides a method for producing a sorbent comprising 1% to 50% by weight wood particles and 50% to 99% by weight ground grain. Preferably, the sorbent comprises 5% to 35% wood particles and more preferably comprises 10% to 30% wood particles. The selected ground grain and wood particles are mixed to form a homogeneous litter mixture. Suitable mixing equipment includes, for example, ribbon or paddle mixers. The homogeneity can be determined visually based on color similarity and color uniformity for samples taken from several locations in the mixing vessel.

One embodiment of the invention provides a pelletized litter. A typical pelletizer has a feeder for the dry components and a conditioner where liquids are added. The conditioned material then flows into the pelleting chamber where the pellet is formed. Varying the compression ratio, moisture content and temperature during pelletization can alter the product characteristics. The compression ratio is typically between about 4:1 and about 9:1. Preferably, the compression ratio is between about 5:1 and about 9:1 and most preferably between about 5:1 and about 8:1. Poor pellets containing a large number of fines are formed at a compression ratio less than about 4:1. The product characteristics can be difficult to reproduce when compression ratios less than about 5:1 are used. Higher amounts of water are needed to form pellets with a compression ratio of 5:1 or less. This amount of water is disadvantageous because more drying of the pellet is required after formation. Good pellets can be formed with smaller amounts of added water at compression ratios greater than about 5:1.

The moisture required for pelletization can be added during the mixing step of the ground grain and wood particles, after the mixing step but in the same vessel used for mixing, or as part of the pelletization process. Preferably, the moisture is added as part of the pelletization process. Lower levels of moisture addition are preferred to minimize the amount of drying required after pelletization. Typically, the moisture content of the litter after mixing ranges from about 7 wt. % to about 14 wt. % based on the weight of the litter. Preferably, the moisture level during pelletization is below about 15 wt. % and more preferably below about 13 wt. % based on the weight of the litter. When compression ratios of 5:1 or less are used, the total water needed to form pellets is in the range of 15 wt. % to about 18 wt. % based on the weight of the litter.

The pelletization temperature preferably is less than the boiling point of water. If the temperature is too high, steam forms decreasing the processability of the materials. Higher temperatures tend to produce pellets with hard shells reducing the sorbency of the litter. If the ground grain is wheat, temperatures in excess of 180° F. (82° C.) can cause gelatinization and decrease the ability of the litter to clump upon exposure to a liquid. Preferably, the pelletization temperature is between about 110° F. (43° C.) and 170° F. (77° C.). More preferably, the pelletization temperature is between about 130° F. (54° C.) and about 170° F. (77° C.).

After formation, the pellets can be dried, for example, in a cooler or a dryer. Cooling can occur by air movement created by a fan. The dryer can be, for example, a fluid bed. Drying can be done in the presence of air or an inert gas. The temperature of the gas exiting the dryer is typically less than 180° F. (82° C.). The final moisture typically is less than about 12 weight %, preferably less than about 11 weight % and more preferably less than about 9 weight %. Lower moisture content minimizes microbial growth in the final product.

Any fines produced can be returned to the pelletizer for re-processing. The typical bulk density of the pellets is between about 0.40 g/cc and about 0.80 g/cc. In one embodiment, the preferred bulk density is about 0.50 g/cc to 0.65 g/cc.

The pellet can be any size that provides the desired sorbency function. Typically, the pellet diameter is between about 1/8" (0.32 cm) and about 1/2" (1.28 cm) and preferably between about 5/32" (0.40 cm) and about 1/4" (0.64 cm). The pellet length typically is between about 2/3" (1.70 cm) and about 1/3" (0.85 cm) and preferably between about 1/2" (1.28 cm) and about 7/16" (1.11 cm).

In another embodiment, the pelletized litter can be crumbled. Crumbling is a process of milling the pelletized litter in a crumbler or roller mill to produce smaller particles. The gap between the rolls determines the size of the crumbled product. A typical range of crumbling is such that a pellet is reduced from about one-fourth to about three-fourths and preferably from about one-half to about two-thirds of the original pellet size. The objective of crumbling is to reduce the size of the pellets without creating a large number of fines.

One aspect of the invention provides a method for preparing pellets comprising ground grain. The ground grain may contain additives that function, for example, to mask or neutralize waste odors, to provide an attractant for an animal, to inhibit bacterial growth or to decrease dust formation. Additives to mask or neutralize odors, for example, can be baking soda or natural products oils such as Nilecho (a natural product oil product containing 50 natural oils sold by Nilodor, Inc., Bolivar, Ohio). Animal attractants, for example, can be natural proteins such as wheat. Anti-dusting agents, for example, can be a vegetable oil such as soybean oil. Surprisingly, in one embodiment, the sorbency of the ground grain litter can be improved upon pelletization even in the absence of wood particles.

In another embodiment, the pellets are crumbled. According to this embodiment, the crumbled litter typically can sorb an amount of liquid based on weight between about 0.5 times to about 5.0 times the weight of the litter. The litter typically sorbs an amount of liquid based on weight equal to at least about 1.0 times and preferably at least about 1.5 times and more preferably at least about 2.0 times the weight of the litter. The swelling is less than about 10% based on the volume of the litter. Preferably there is no volume change or more preferably the litter shrinks upon contact with liquid. The % attrition is typically less than about 15% and preferably less than about 10%.

Another aspect of the invention provides a method of sorbing liquid using a sorbent comprising ground grain and wood particles. Ground grain and wood particles are selected and mixed to produce a litter mixture. The mixture contains from 50% to 99% by weight of a ground grain and from 1% to 50% by weight of wood particles. The mixture preferably comprises about 5% to about 35% wood particles and more preferably comprises about 10% to about 30% wood particles. The litter may contain additives that function, for example, to mask or neutralize waste odors, to provide an attractant for an animal, to inhibit microbial growth or to prevent dust formation. The litter is situated such that a liquid to be sorbed can contact it. Upon contact with the liquid, the litter mixture sorbs an amount of liquid based on weight equal to at least about 1.0 times and preferably 1.5 times and more preferably at least 2.0 times the weight of the litter mixture. Typically the litter sorbs an amount of liquid based on weight between about 0.5 times and 5.0 times the weight of the litter.

Another aspect of the invention provides a method of sorbing liquid by preparing a litter comprising ground grain. The ground grain may contain additives that function, for example, to mask or neutralize waste odors, to provide an attractant for an animal, to inhibit bacterial growth or to prevent dust formation. The ground grain litter may include additives such as wood particles to enhance sorbency. The litter is pelletized and optionally crumbled. The pelletized or crumbled litter mixture is situated such that it is actually contacted by a liquid.

The following examples further describe the method for preparing a ground grain litter of the invention and the tests performed to determine the various characteristics of the litter. In the following examples, the ground grain is wheat and the wood particles are aspen; the invention is not limited to these materials. The examples are provided for exemplary purposes to facilitate understanding of the inventions and should not be construed to limit the invention to the examples.

EXAMPLES

Example 1

Characterization of Aspen and Ground Wheat Starting Materials

In this example, the aspen starting material was a by-product of the lumber milling industry. Wood chips were dried in a tumble dryer to about 8 wt. % moisture based on the weight of the wood chips. The dried chips were ground in a dual stage hammer mill with an 8-mesh screen. The ground wheat (GW) was prepared from raw whole spring wheat that was cleaned and ground in a single head roller mill with a 10-mesh screen.

The particle size distribution of the wood particles and ground wheat was determined by shaking the samples for 5 minutes in a series of sieves ranging in size from 4 mm to 125 μm. The particle size distribution of the ground wheat and aspen are shown in Table 1. All of the ground wheat and 97% of the wood particles were less than 4.0 mm. Only 1% of each raw material was smaller than 125 μm.

TABLE I

Particle Size Distribution of Ground Wheat and Aspen

| Screen Size | Aspen - % Retained | Ground Wheat - % Retained |
|---|---|---|
| No. 5–4.0 mm | 3 | 0 |
| No. 7–2.8 mm | 18 | 0 |
| No. 10–2.0 mm | 28 | 1 |
| No. 25–707 μm | 36 | 83 |
| No. 45–354 μm | 10 | 10 |
| No. 60–250 μm | 2 | 3 |
| No. 80–177 μm | 1 | 1 |
| No. 120–125 μm | 1 | 1 |
| <125 μm | 1 | 1 |

The bulk density for the starting materials was determined by dividing the weight in grams of a sample by the volume of the sample in milliliters. After the sample was weighed, it was put into a measuring cylinder and tapped gently until no further settling was observed. The volume was then read. The ground wheat has a higher bulk density than aspen as shown in Table II.

The sorbency of the litter mixture, wood particles, and ground grain was determined using ASTM Standard Method F 726-99 (published in 1999) for type II adsorbents. Water was placed in the test cell, a glass crystallizing dish. A sample of the litter was weighed, placed in a wire mesh basket (27 mesh size −0.063" −0.16 cm) and lowered into the test cell. Some of the sorbent floated within the test cell. After 15 minutes, the sorbent was removed from the water using the mesh basket. The basket was allowed to drain for 30 minutes. The sorbent is weighed again to calculate the amount of liquid sorbed. Table II shows the sorbency for aspen and ground wheat. Aspen sorbed an amount of water greater than 2.5 times the weight of the aspen. The ground grain sorbed an amount of water just slightly less than the weight of the ground grain.

Upon exposure to water, the ground wheat forms a clump but the aspen does not.

TABLE II

Bulk Density and Sorbency of Aspen and Ground Wheat

| Raw Material | Bulk Density, g/cc | Start Wt. (g) | End Wt. (g) | Water Sorbed (g) | g Water Sorbed/g Sorbent |
|---|---|---|---|---|---|
| Aspen | 0.509 | 25.3 | 97.7 | 72.4 | 2.86 |
| GW | 0.570 | 25.1 | 49.4 | 24.3 | 0.97 |

Example 2

Preparation of Mixtures of Ground Grain and Aspen

The ground grain and aspen from Example 1 were mixed in various proportions ranging from 5% to 15% aspen in the mixture. A ribbon mixer was used to combine the materials. Mixing was continued until three samples pulled from different regions of the mixing vessel had the same color and color uniformity.

The sorbency of the samples was determined using ASTM Standard F-726-99 for type II adsorbents. The sorbency values are reported in Table III.

TABLE III

Sorbency of Ground Grain/Aspen Mixtures

| Product | Start Wt. (g) | End Wt. (g) | Water Sorbed (g) | g Water Sorbed/g Sorbent |
|---|---|---|---|---|
| GW/5% aspen | 25.1 | 52.7 | 27.6 | 1.10 |
| GW/10% aspen | 25.4 | 53.6 | 28.2 | 1.11 |
| GW/15% aspen | 25.1 | 58.3 | 33.2 | 1.32 |

The addition of only 5% aspen to the ground grain increased the sorbency over 10% and the addition of 15% aspen increased the sorbency over 30% compared to the ground grain alone.

Example 3

Variation of Moisture Content During Pelletization

A litter mixture containing 30% aspen based on the weight of the mixture was prepared by mixing the ground wheat and aspen using the procedure described in Example 2. The ground wheat and aspen are identical to those described in Example 1. The pellets were formed using a pelletizer supplied by California Pellet Mill, Sacramento, Calif. Similar equipment is available, for example, from Sprout-Waldon, Crawfordsville, Ind. The compression ratio was 4:1 and the diameter of the pellets was 3/16" (0.48 cm). The moisture added to process the materials through the pelletizer was varied. The temperature of the product as it entered the pelletizer was about 70° F. (21° C.) and the exit temperature varied from 128° F. (53° C.) to 150° F. (66° C.) depending on the water content. The exit temperature from the pelletizer decreased with the addition of more moisture. All samples were dried to between 10% and 11% moisture based on the weight of the mixture after pelletization. The sorbency and bulk density were determined and are shown in Table IV. The bulk density decreased with higher moisture content and correspondingly lower processing temperatures.

TABLE IV

Variation of Moisture Content during Pelletization

| % Moisture before Pelletization | % Moisture after Pelletization | Exit Temperature | Density, g/ml | g Sorbed/ g Sorbent |
|---|---|---|---|---|
| 12.5 | 11.9 | 150° F. (66° C.) | 0.516 | 2.97 |
| 14.2 | 13.7 | 145° F. (63° C.) | 0.490 | 2.73 |
| 15.4 | 12.8 | 128° F. (53° C.) | 0.455 | 2.88 |

Example 4

Pelletized Ground Wheat Litter

Pellets were formed from the ground wheat without the addition of aspen. The compression ratio (CR) was varied from 3:1 to 8:1 with a pellet diameter of 3/16" (0.48 cm). With a compression ratio of 3:1, more water was required for processing and the pellets were not well formed. The sorbency of the samples decreased with higher compression ratios as shown in Table V.

TABLE V

Pelleted Ground Wheat

| Compression Ratio | % Moisture before Pelletization | Density, g/ml | g Sorbed/ g Sorbent | Temperature, ° C. |
|---|---|---|---|---|
| 3:1 | 13.8 | 0.585 | 1.11 | 46 |
| 5:1 | 13.4 | 0.582 | 0.76 | 51 |
| 8:1 | 12.8 | 0.615 | 0.74 | 61 |

Example 5

Crumbled Ground Wheat Litter

A series of pelletized litters were prepared from the ground wheat described in Example 1. The compression ratio during pelletization was varied from 4 to 6.4. The pellet diameter was either 3/16" (0.48 cm) or 5/32" (0.40 cm). The moisture content varied from 13.5 wt. % to 15.0 wt. % based on the weight of the litter. The exit temperature varied from 130° F. (54° C.) to 140° F. (60° C.). The pellets were then crumbled to about two-thirds of their original size. The crumbler was supplied by Roskamp-Champion, Crawfordsville, Ind. Similar equipment is available from Modern Processing Equipment, Chicago, Ill. Adjusting the gap between rollers in the crumbler can vary the extent of crumbling.

The sorbency was higher for crumbled material compared to pelletized material as shown in Table VI. With a compression ratio of 5:1, the sorbency increased from 0.76 to 1.37 g sorbed/g sorbent. The sorbency decreased with higher compression ratios.

TABLE VI

Crumbled Ground Wheat Litter

| Compression Ratio | Pellet Diameter, cm | Bulk Density, g/ml | g Sorbed/ g Sorbent | % Moisture before Pelletization | Temperature, ° C. |
|---|---|---|---|---|---|
| 4:1 | 0.48 | 0.540 | 1.72 | 15.0 | 135 |
| 5:1 | 0.48 | 0.530 | 1.37 | 15.0 | 130–135 |
| 6.4:1 | 0.40 | 0.468 | 1.49 | 13.5 | 140–144 |

Example 6

Pelleted Ground Wheat/Aspen Litter

A litter mixture containing 25% aspen based on the weight of the mixture was prepared by mixing the ground wheat and aspen as described in Example 2. The mixture was formed into pellets with a diameter of 3/16" (0.48 cm). The pellets were then crumbled to two-thirds of the original size of the pellets. For these samples, lower compression ratios improve the sorbency of the litter mixture as shown in Table VII.

TABLE VII

Pelleted Ground Wheat/Aspen Litter

| Compression Ratio | Pellet Diameter, cm | Bulk Density, g/ml | g Sorbed/ g Sorbent | % Moisture before Pelletization | Temperature, ° C. |
|---|---|---|---|---|---|
| 4:1 | 0.48 | 0.545 | 2.01 | 15.0 | 135 |
| 5:1 | 0.48 | 0.591 | 1.69 | 15.0 | 130–135 |

Example 7

Crumbled Ground Wheat/Aspen Litter

A litter mixture containing 25% aspen based on the weight of the mixture was prepared by mixing the ground wheat and aspen as described in Example 2. The mixture was formed into pellets with a diameter of either 3/16" (0.48 cm) or 5/32" (0.40 cm). The moisture content before pelletization was 15 wt.% and the exit temperature from the pelletizer was between 130° F. (54° C.) and 135° F. (57° C.). The pellets were then crumbled to either one-half or two-thirds of the original size of the pellets. Crumbling increased the sorbency of the materials as shown in Table VIII. With a compression ratio of 5:1, one gram of crumbled product can sorb 0.31 grams more of a liquid compared to the same quantity of pelletized product.

TABLE VIII

Crumbled Ground Wheat/Aspen Litter

| Compression Ratio | Pellet Diameter, cm | Extent of Crumbling | Bulk Density, g/ml | g Sorbed/ g Sorbent |
|---|---|---|---|---|
| 4:1 | 0.48 | 2/3 pellet size | 0.430 | 2.55 |
| 5:1 | 0.48 | 2/3 pellet size | 0.479 | 2.00 |
| 6.4:1 | 0.40 | 1/2 pellet size | 0.436 | 1.94 |

Example 8

Size Distribution of Crumbled Litter

Table IX shows the bulk density and size distributions for three litters: ground wheat, ground wheat with 25% aspen by weight and ground wheat with 30% Aspen by weight. The ground wheat and Aspen are the same as those in Example 1. The compression ratio, pellet diameter and extent of crumbling were varied. The crumbled materials were shaken for 5 minutes in a set of sieves ranging in size from 4.0 mm to less than 125 microns. The fraction of the total sample collected on each sieve is in Table IX.

TABLE IX

Bulk Density and Size Distribution

| Sample No. | Sample | Compression Ratio | Pellet Diameter (cm) | Extent of Crumbling | Bulk Density (g/cc) |
|---|---|---|---|---|---|
| 1 | GW | 4:1 | 0.48 | ½ pellet size | 0.550 |
| 2 | GW | 4:1 | 0.48 | ⅔ pellet size | 0.535 |
| 3 | GW | 5:1 | 0.48 | ½ pellet size | 0.550 |
| 4 | GW | 5:1 | 0.48 | ⅔ pellet size | 0.550 |
| 5 | GW | 6.4:1 | 0.40 | ½ pellet size | 0.605 |
| 6 | GW | 8:1 | 0.48 | ⅔ pellet size | 0.630 |
| 7 | GW | 8:1 | 0.48 | ½ pellet size | |
| 8 | GW - 25 Aspen | 4:1 | 0.48 | ½ pellet size | 0.500 |
| 9 | GW - 25 Aspen | 4:1 | 0.48 | ⅔ pellet size | 0.479 |
| 10 | GW - 25 Aspen | 5:1 | 0.48 | ½ pellet size | 0.510 |
| 11 | GW - 25 Aspen | 5:1 | 0.48 | ⅔ pellet size | 0.525 |
| 12 | GW - 25 Aspen | 6.4:1 | 0.40 | ½ pellet size | 0.475 |
| 13 | GW - 30 Aspen | 4:1 | 0.48 | ½ pellet size | 0.460 |
| 14 | GW - 30 Aspen | 4:1 | 0.48 | ⅔ pellet size | 0.455 |
| 15 | GW - 30 Aspen | 5:1 | 0.48 | ½ pellet size | 0.470 |
| 16 | GW - 30 Aspen | 5:1 | 0.48 | ⅔ pellet size | 0.470 |

| Sample No. | Sieve No. 5 4.0 mm | Sieve No. 7 2.8 mm | Sieve No. 10 2.0 mm | Sieve No. 25 707 μm | Sieve No. 45 354 μm | Sieve No. 60 250 μm | Sieve No. 80 177 μm | Sieve No. 120 125 μm | <125 μm |
|---|---|---|---|---|---|---|---|---|---|
| 1 | 1 | 34 | 19 | 39 | 6 | 1 | 1 | 0 | 0 |
| 2 | 6 | 34 | 18 | 34 | 6 | 2 | 1 | 0 | 0 |
| 3 | 2 | 27 | 25 | 37 | 6 | 2 | 1 | 0 | 0 |
| 4 | 5 | 38 | 18 | 32 | 5 | 1 | 1 | 0 | 0 |
| 5 | 0 | 36 | 35 | 22 | 4 | 1 | 1 | 1 | 0 |
| 6 | 0 | 6 | 30 | 51 | 7 | 2 | 1 | 2 | 1 |
| 7 | 1 | 20 | 33 | 37 | 5 | 1 | 1 | 1 | 1 |
| 8 | 2 | 38 | 17 | 33 | 6 | 2 | 1 | 1 | 0 |
| 9 | 12 | 49 | 8 | 22 | 6 | 1 | 1 | 1 | 0 |
| 10 | 1 | 28 | 22 | 38 | 7 | 1 | 1 | 1 | 0 |
| 11 | 4 | 37 | 17 | 32 | 7 | 1 | 1 | 1 | 0 |
| 12 | 2 | 39 | 11 | 34 | 9 | 2 | 1 | 2 | 0 |
| 13 | 16 | 45 | 9 | 23 | 5 | 1 | 1 | 1 | 0 |
| 14 | 1 | 29 | 23 | 36 | 7 | 2 | 1 | 2 | 0 |
| 15 | 4 | 46 | 8 | 29 | 8 | 2 | 1 | 1 | 1 |

Crumbling to a smaller diameter result in particle size distributions with a smaller fraction of the particles collected in the largest sieve. The majority of the crumbled product was larger than 250 microns.

Example 9

Swelling Test

The swelling test was conducted by filling a graduated beaker to the 200 ml mark with a sample of litter. A weighed amount of water was added to the litter. After 15 minutes, the litter was poured onto a tray. The wetted litter formed a clump and was easily separated from the unwetted litter. The clump was weighed and then submersed in a graduated cylinder filled to a specific volume of water. The volume of water displaced by the clump was measured. The unwetted litter was weighed to calculate the volume of wetted litter used. One sample was ground wheat litter formed into a 5/32" (0.40 cm) pellet and crumbled to two-thirds its particle size. The other sample was a mixture of 75 wt. % ground wheat and 25 wt. % aspen pelletized and crumbled under the same conditions. The results are in Table X.

TABLE X

Swelling Test

| Sample | Weight of 200 ml sample, g | Weight of clump minus weight of water, g | Weight of unwetted litter, g | Volume displaced, ml | Calculated volume, ml |
|---|---|---|---|---|---|
| GW - Aspen | 89.4 | 12.5 | 76.6 | 18 | 28 |
| GW | 120.3 | 14.3 | 105.6 | 20 | 23.8 |

For both the ground wheat litter and the litter containing both ground wheat and aspen, the volume displaced by the sorbent was less than the calculated volume. The materials contracted upon exposure to liquid. The volume displaced was about 36% lower for the GW-Aspen litter and 16% lower for the GW litter.

From the foregoing detailed description it will be evident that modification can be made in the devices and methods of the invention without departing from the spirit or scope of the invention. Therefore, it is intended that all modifications and variations not departing from the spirit of the invention come within the scope of the claims and their equivalents.

What is claimed is:

1. A sorbent composition for sorbing a liquid, the sorbent comprising a pellet or crumpled pellet comprising:
    (a) 50% to 99% by weight of a whole ground grain; and
    (b) 1 to 50% by weight of wood particles, said sorbent swelling less than about 10% based on the volume of the sorbent when sorbing a maximum amount of liquid.

2. The sorbent composition of claim 1, wherein the ground grain is selected from the group consisting of white wheat, spring wheat, winter wheat, durum and combinations thereof.

3. The sorbent composition of claim 1, wherein the wood particles are a sorbent material.

4. The sorbent composition of claim 1, wherein the wood particles sorb an amount of liquid based on weight between about 0.5 times to about 5 times the weight of the wood particles.

5. The sorbent composition of claim 1, wherein the wood particles sorb an amount of liquid based on weight equal to at least about the weight of the wood particles.

6. The sorbent composition of claim 1, wherein the wood particles are aspen.

7. The sorbent composition of claim 1, wherein the ground grain is hard red spring wheat and the wood particles are aspen.

8. The sorbent composition of claim 1, wherein the sorbent comprises about 5% to about 35% by weight wood particles.

9. The sorbent composition of claim 1, wherein the sorbent comprises about 10% to about 30% by weight wood particles.

10. The sorbent of claim 1, wherein the sorbent can sorb an amount of liquid based on weight equal to about 0.5 times to about 5 times the weight of the sorbent.

11. The sorbent composition of claim 1, wherein the sorbent clumps upon contact with the liquid.

12. A method for sorbing a liquid comprising the steps of:
   (a) selecting a whole ground grain;
   (b) selecting wood particles:
   (c) -mixing the whole ground grain from step (a) and the wood particles from step (b) to produce a litter mixture, wherein the litter mixture comprises 50% to 99% by weight whole ground grain particles and 1% to 50% by weight wood particles;
   (d) forming a pelletized or crumbled pelletized litter comprising the litter mixture;
   (e) situating the pelletized or-crumbled pelletized litter to be contacted by a liquid to be sorbed; and
   (f) contacting the pelletized or crumbled pelletized litter with a liquid to be sorbed, said litter swelling less than about 10% based on the volume of the litter when sorbing a maximum amount of liquid.

13. The method of claim 12, wherein the whole ground grain of step (a) is hard red spring wheat and the wood particles of step (b) are aspen.

14. The method of claim 12, wherein the pelletized or crumbled pelletized litter can sorb an amount of liquid based on weight equal to at least about the weight of the pelletized or crumbled pelletized litter.

15. The method of claim 12, wherein the pelletized or crumbled pelletized litter clumps upon contact with a liquid.

16. The method of claim 12, wherein the liquid is urine.

17. A method of producing a sorbent for a liquid comprising the steps of:
   (a) selecting a whole ground grain;
   (b) selecting wood particles:
   (c) mixing the whole ground grain from step (a) and the wood particles from step (b) to produce a litter mixture, wherein the litter mixture comprises 50% to 99% by weight whole ground grain particles and 1% to 50% by weight wood particles; and
   (d) extruding a pelletized or crumbled pelletized litter comprising the litter mixture, said litter swelling less than about 10% based on the volume of the litter when sorbing a maximum amount of liquid.

18. The method of claims 17, wherein the ground grain of step (a) is selected from the group consisting of white wheat, spring wheat, winter wheat, durum and combinations thereof.

19. The method of claim 17, wherein the litter mixture comprises about 5% to about 35% by weight wood particles.

20. The method of claim 17, wherein the litter mixture comprises about 10% to about 30% by weight wood particles.

21. The method of claim 17, wherein the sorbent can sorb an amount of liquid based on weight between about 0.5 times and about 5 times the weight of the sorbent.

22. The method of claim 17, wherein the sorbent can sorb an amount of liquid based on weight equal to at least the weight of the sorbent.

23. The method of claim 17, wherein the wood particles sorb an amount of liquid based on weight between about 0.5 times and about 5.0 times the weight of the wood particles.

24. The method of claim 17, wherein the wood particles sorb an amount of liquid based on weight equal to at least about the weight of the wood particles.

25. The method of claim 17, wherein the whole ground grain of step (a) is hard red spring wheat and the wood particles of step (b) are aspen.

26. The method of claim 25, wherein the sorbent clumps upon contact with the liquid.

27. A method of producing a sorbent for a liquid comprising the steps of:
   (a) selecting a whole ground grain;
   (b) selecting wood particles and mixing the wood particles with the ground grain from step (a); and
   (c) extruding a pellet or crumbled pellet comprising the whole ground grain from step (a) and the wood particles from step (b),
wherein the sorbent sorbing a maximum amount of liquid swells to less than about 10% based on the volume of the sorbent.

28. The method according to claim 27, wherein the ground grain of step (a) is selected from the group consisting of white wheat, spring wheat, winter wheat, durum and combinations thereof.

29. The method according to claim 27, wherein the ground grain can sorb an amount of liquid based on weight equal to at least the weight of the pellets.

30. The method according to claim 27, wherein the ground grain can sorb an amount of liquid based on weight between about 0.5 times and about 5.0 times the weight of the pellets.

31. The method according to claim 30, wherein the ground grain clumps upon contact with liquid.

32. The method according to claim 30, wherein the ground grain sorbing a maximum amount of sorbed liquid swells to less than 10% based on the volume of the sorbent.

33. A particulate sorbent comprising a homogeneous mixture of whole ground grain, about 5% to about 35% by weight ground wood particles, said sorbent swelling less than about 10% based on the volume of the sorbent when sorbing a maximum amount of liquid.

34. The particulate sorbent of claim 33 that contains about 10% to about 30% by weight wood particles.

35. The particulate sorbent of claim 33 that has no volume change on sorbing a maximum amount of liquid.

* * * * *